(No Model.)
T. G. TURNER.
STOPPER FOR BOTTLES.
No. 389,677. Patented Sept. 18, 1888.
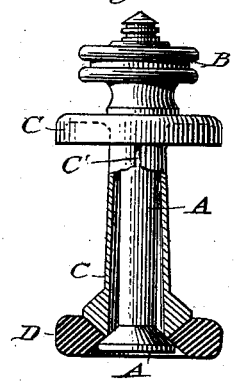
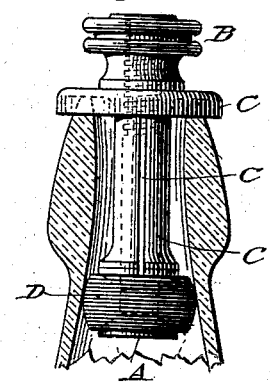
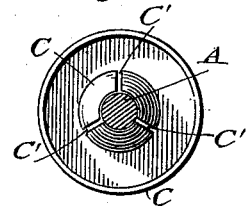
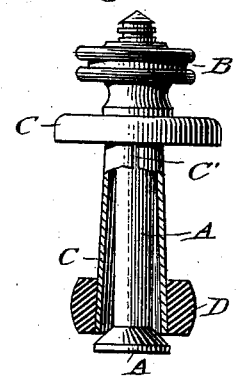
WITNESSES:
INVENTOR
Thomas G. Turner
BY
W. J. Townsend
ATTORNEY

UNITED STATES PATENT OFFICE.

THOMAS GILPIN TURNER, OF NEW YORK, N. Y.

STOPPER FOR BOTTLES.

SPECIFICATION forming part of Letters Patent No. 389,677, dated September 18, 1888.

Application filed November 1, 1887. Serial No. 254,027. (No model.)

*To all whom it may concern:*

Be it known that I, THOMAS GILPIN TURNER, a citizen of the United States, and a resident of New York city, in the county of New York and State of New York, have invented certain new and useful Improvements in Stoppers for Bottles, of which the following is a specification.

My invention relates to stoppers for bottles, and has for its object a stopper in which a rubber jacket is made to expand within the neck of the bottle by means of a bolt and collar thereon operated by a nut. I accomplish this object by means of a threaded bolt, a collar thereon, and a rubber ring or jacket placed thereon between the head of the bolt and the extremity of the collar, and a nut upon the threaded end of the bolt, whereby the collar is pressed into or against the rubber jacket, thereby expanding it.

The construction and operation of my device will more fully appear by reference to the accompanying drawings, in which—

Figure 1 is a view, partially in section, of the stopper, showing the head of the bolt and the extremity of the collar conical in form and the collar split, as hereinafter described, and the rubber jacket distended. Fig. 2 is an elevation of the stopper formed as in Fig. 1, with the rubber jacket in its normal condition. Fig. 3 is a bottom plan view of the collar as shown in Fig. 2. Fig. 4 is a view, partially in section, showing the head of a bolt conical in form and the extremity of the collar flat.

Like letters refer to corresponding parts.

A is a threaded bolt.

B is a nut fitting upon the threaded end of the bolt A.

C is a collar, preferably of metal, surrounding the bolt A.

D is a rubber jacket placed upon the bolt A between its head and the extremity of the collar C.

The head of the bolt A and the extremity of the collar C may be made, one or both of them, conical in form, as shown in Figs. 1, 2, and 4. The advantage of this form in preference to stoppers having a bolt and collar with parallel surfaces, between which a rubber ring is pressed, as has heretofore been used, is that the outward thrust of the rubber jacket D is produced by expansion instead of compression and the tendency of the rubber to become hardened and set in its expanded shape is avoided, and a much greater expansion of the rubber jacket is obtained.

In operation the turning of the nut B presses the head of the bolt A and the extremity of the collar C against and into the rubber jacket D, thereby expanding the same toward and against the neck of the bottle and tightly closing the same. The collar C is split into two or more longitudinal sections, as shown in Figs. 1, 2, and 3. If the rubber jacket is not sufficiently expanded to tightly close the neck of the bottle when the conical head of the bolt A and the conical extremity of the collar C have met within the rubber jacket, the continued operation of the nut B will draw the head of the bolt into the orifice of the collar C, thereby separating the lower extremity of the sections forming the collar C and thrusting the rubber jacket farther outward by direct expansion until the neck of the bottle is tightly closed. The rubber jacket D may be fitted upon the end of the collar C and extended by the separation of the sections of the collar, as shown in Fig. 4.

What I claim, and desire to secure by Letters Patent, is—

1. The combination of a threaded bolt, A, having a conical-shaped head, a nut, B, collar C, split into two or more longitudinal sections and having a conical-shaped end, and a rubber jacket, substantially as described, and for the purposes set forth.

2. The combination of a threaded bolt, A, having conical-shaped head, a nut, B, collar C, split into two or more longitudinal sections, and a rubber jacket, substantially as described, and for the purposes set forth.

Signed at New York city, in the county of New York and State of New York, this 25th day of October, A. D. 1887.

THOMAS GILPIN TURNER.

Witnesses:
W. J. TOWNSEND,
GEO. FENN.